United States Patent [19]

Manos

[11] 4,120,098
[45] Oct. 17, 1978

[54] SOLVENT EXCHANGE DRYING OF MEMBRANES FOR GAS SEPARATION

[75] Inventor: Philip Manos, Wilmington, Del.

[73] Assignee: E. I. Du Pont de Nemours and Company, Wilmington, Del.

[21] Appl. No.: 698,695

[22] Filed: Jun. 22, 1976

[51] Int. Cl.² ............................................. B01D 31/00
[52] U.S. Cl. ............................................. 34/9; 55/16; 210/500 M; 264/344
[58] Field of Search ............ 210/500 M, 23 H, 321 R; 55/16; 264/41, 330, 340, 344; 34/9; 260/25 AY

[56] References Cited

U.S. PATENT DOCUMENTS

| | | | |
|---|---|---|---|
| 3,342,729 | 9/1967 | Strand | 55/16 X |
| 3,592,672 | 7/1971 | Rowley et al. | 210/500 M X |
| 3,710,945 | 1/1973 | Dismore | 210/500 M X |
| 3,822,202 | 7/1974 | Hoehn | 210/23 H |
| 3,899,308 | 8/1975 | Hoehn et al. | 55/16 |

*Primary Examiner*—Frank A. Spear, Jr.

[57] ABSTRACT

Process for drying a water-wet permselective membrane by contacting the membrane with water replacement liquid under conditions which result in minimal shrinkage based on the surface tension, viscosity, concentration, molar volume, and temperature of the components of the system.

6 Claims, No Drawings

SOLVENT EXCHANGE DRYING OF MEMBRANES FOR GAS SEPARATION

BACKGROUND OF THE INVENTION

Separation processes such as dialysis, ultrafiltration, and reverse osmosis have been used in the separation of a wide variety of impurities from solutions. The development and improvement of membranes for such systems has permitted their use, for example, in the desalination of brackish and saline waters.

The eminent success of the membranes used in permselective applications has prompted consideration of their use in the separation of gases. Such membranes are generally prepared in a water-wet condition, and various techniques have been tested for removal of the water to dryness. Direct drying techniques, however carefully controlled, seem unsatisfactory. The replacement of the water with a series of polar and non-polar liquids has met with some success in the drying of cellulose acetate membranes. However, previous attempts to dry the highly desirable membranes of polymers having high surface tension have resulted in the destruction of the membrane structure that is critical to the function of such separatory membranes.

SUMMARY OF THE INVENTION

The instant invention provides a process for drying a class of water-wet separatory membranes which results in substantial retention of the structure necessary for separatory performance and makes practical their use in gas separation applications.

Specifically, the instant invention provides an improvement in the process for drying water-wet, semipermeable, polymeric membranes by contacting the membrane with at least one replacement liquid inert to the membrane and to the membrane-wetting liquid to substantially completely remove water from the membrane and removing the replacement liquid from the membrane, which improvement comprises contacting, at a temperature of about from $-50°$ C. to $50°$ C., a water-wet semipermeable membrane of a polymer having a Critical Surface Tension of at least about 42 dynes/cm with at least one replacement liquid which comprises at least one organic solvent or an aqueous solution thereof, which organic solvent is capable of penetrating the membrane and has a surface tension of less than about 35 dynes/cm at $20°$ C. and a hydrogen bonding parameter of at least about 1.5 (calories per cubic centimeter)$^{\frac{1}{2}}$ and wherein the relative surface tension of the membrane-wetting liquid, the concentration of the solvent in the replacement liquid and the viscosity and the molar volume of the organic solvent are such as to provide in each step a Permeation Factor less than or equal to about 50, provided, however, that when the temperature of contact is about from $20°$ C. to $-50°$ C., the Permeation Factor is less than or equal to about $100 - 2.5$ T, wherein T is the temperature of contact in degrees centigrade.

DETAILED DESCRIPTION OF THE INVENTION

Membranes which can be dried according to the instant invention include semipermeable membranes of polymers having high surface tension and which rely at least in part on a physical structure for their performance. Included are membranes which are asymmetric, being formed with a relatively dense skin on one surface of a more porous structure. The polymers are characterized by a Critical Surface Tension of at least about 42 dynes per centimeter.

The Critical Surface Tensions of polymers are measured by techniques described by Baier and Zisman in Macromolecules, Volume 3, pages 462 to 468, 1970, employing glycerine, 2,2'-thiodiethanol, diiodomethane, and 1-bromonaphthalene, for example, as spreading liquids. Three to five measurements are made of the advancing contact angle of each liquid on a polymer surface as described by Shafrin and Zisman in the Journal of Colloid Science, Volume 7, pages 166 to 177, 1952, and the extrapolated surface tension at zero contact angle is calculated by linear regression (minimum sum of squares of deviations method). Similar procedures are described in "Contact Angle, Wettability and Adhesion," R. F. Gould, editor, Advances in Chemistry Series No. 43, American Chemical Society, Washington, 1964, especially at pages 12 to 22. A recent tabulation of polymer Critical Surface Tension values, some of which are determined by procedures different from that described above, is given in "Polymer Handbook," Second Edition, J. Bandrup and E. H. Immergut, editors, Wiley, New York, 1975, at pages III-221 to III-228. Membranes of polymers having Critical Surface Tensions below about 42 dynes per centimeter, such as those prepared from highly acetylated cellulose acetate, can be dried without excessive loss in gas permeability properties by techniques outside the present invention process.

A wide variety of organic polymers can have Critical Surface Tensions of at least about 42 dynes per centimeter and can therefore be used in the preparation of membranes which can be dried according to the process of this invention. Included are membranes of aliphatic polyamides, such as those described by Cescon et al. in U.S. Pat. No. 3,551,331 and those of methoxymethyl nylons described by Hookway et al. in United Kingdom Patent No. 816,572 and of aromatic polyamides such as those described by Richter et al. in U.S. Pat. No. 3,567,632, by Ikeda et al. in U.S. Pat. No. 3,878,109, by McKinney et al. in U.S. Pat. No. 3,904,519, by Rio in U.S. Pat. No. 3,686,116, by Blanchard et al. in U.S. Pat. No. 3,619,424, and by Wrasidlo in U.S. Pat. No. 3,816,303, and of other nitrogen-linked polymers such as polyimidazopyrrolones, polybenzimidazoles, polybenzimidazolones, polybenzoxazoles, polybenzothiazoles, polyimides, poly(ester-amides), poly(ether-amides), and polyureas. Still other specific membranes which can be dried by the instant process include those prepared from polyamides comprising the reaction products of piperazine and a dihalide of fumaric acid or of a substituted fumaric acid and from polyamides comprising the reaction products of a piperazine with a dicarboxylic acid or acid anhydride described by Credali in U.S. Pat. No. 3,696,031. Sulfonated poly(arylene ether sulfone) membranes which can be dried according to the instant invention include those prepared according to the teaching of Bournagel in U.S. Pat. No. 3,855,122 as well as Graefe et al. in U.S. Pat. No. 3,875,096. Sulfonated poly(xylylene oxide) membranes which can also be so dried include those described by Salemme in U.S. Pat. No. 3,735,559. Membranes based on such polymers containing amide linkages, in particular those containing aromatic carboxamide linkages, constitute a particularly valuable class of polar membrane that can be advantageously dried by the method of the present invention. Membranes of nitrogen-linked aromatic polymers containing ether or sulfone linkages can also be dried by this method.

The membrane can be in any form presenting a surface suitable for its permselective use, such as self-supporting films, hollow fibers and composite structures wherein the permselective polymer surmounts and is supported by a structure of a different composition, such as a porous polymer, glass, or ceramic. Hollow fiber membranes present high surface areas and are preferred.

The separation membranes to which the present invention is applicable are prone to shrinkage when subjected to drying techniques outside of the instant invention. Shrinkage is readily observable as a decrease in the exposed area or a decrease in at least one linear dimension where the membrane is unrestrained as in a self-supporting film or a hollow fiber. Such dimensional change may not be evident where the membrane is restrained, as in the form of a permselective coating joined to an inert porous support, but may be manifest as a thickening of the skin of the permselective structure. In all these cases, however, the membranes exhibit a marked depreciation in flux when tested in gas separation applications.

The membranes dried by the instant process are water-wet. In the context of the present invention, the term water-wet is understood to mean that a major portion, that is, at least about 50 weight percent, of the liquid with which the membrane is wet is water. The remainder of the liquid with which the membrane is wet can be any polar or non-polar liquid, but more satisfactory results are generally obtained when the remainder of the membrane wetting liquid is a polar liquid, especially those selected from alcohols and polyols having from 1 to 4 carbon atoms.

In the course of this process the membranes may become wet with aqueous liquids containing less than 50% water, but in all cases the membrane is contacted with one or more water replacement liquids in sufficient steps to remove substantially all water from the membrane. Accordingly, the water replacement liquid in the last water replacement step is substantially water-free and the resulting liquid-wet membrane contains so little water that the properties of the dry membrane obtained after the remaining steps in the process are not significantly affected thereby.

In accordance with the various embodiments of the instant invention, the water-wet membrane is contacted with at least one replacement liquid, each replacement liquid being an organic solvent or an aqueous solution thereof. The organic solvent should be sufficiently inert to both the membrane and the components of the wetting liquid to avoid any significant depreciation of membrane properties. In addition, the organic solvent should be capable of penetrating the membrane, having suitably low viscosity and small molar volume. Those organic solvents having a viscosity of less than about 10 centipoise and a molar volume less than about 200 cubic centimeters per mole at 20° C. are generally capable of penetrating the semipermeable membranes to which the invention is applicable.

Especially good performance characteristics are obtained when the viscosity of the organic solvent is less than about 6 centipoise and the molar volume is not greater than about 125 cubic centimeters per mole. Particularly preferred are organic solvents having viscosities less than about 3 centipoise and molar volumes less than about 95 cubic centimeters per mole. Molar volumes of many liquids are tabulated by Hansen and Beerbower in an article "Solubility Parameters" in the Kirk-Othmer "Encyclopedia of Chemical Technology," Second Edition, Supplementary Volume, pages 889 to 910, Wiley, New York, 1971, and by Barton in Chemical Reviews, Volume 75, pages 731 to 753, 1975.

It has been found that an important function of the replacement liquid is the lowering of the surface tension of the membrane wetting liquid. Accordingly, the air-liquid surface tension of the organic solvent in the replacement liquid should be less than about 35 dynes per centimeter at 20° C., and preferably less than about 30 dynes per centimeter. In addition, the organic solvent should be sufficiently polar to replace water in the membrane. Accordingly, the organic solvent should exhibit a hydrogen bonding parameter of about from 1.5 to 11 (calories per cubic centimeter)$^{\frac{1}{2}}$, and preferably at least about 2.5. The hydrogen bonding parameters of many liquids are tabulated by Hansen and Beerbower and by Barton in the references cited above.

Within these requirements, a wide variety of organic solvents can be used as components of the replacement liquid. In general, the lower molecular weight solvents of a given class will exhibit a greater solubility in and for water, while solvents of higher molecular weight are more effective to lower the surface tension of water.

Aliphatic alcohols which can be used include those having about from 1 to 8 carbon atoms, such as methanol, ethanol, isopropanol and n-butanol. Those alcohols having from 4 to 8 carbon atoms are particularly effective to lower the surface tension of water, while those having from 1 to 3 carbon atoms are particularly effective for their ability to replace water from a membrane.

Aliphatic aldehydes and ketones which can be used include acetaldehyde, methyl ethyl ketone and methyl isobutyl ketone. Typical carboxylic acids which can be used include acetic acid, propionic acid, butynoic acid and 2-ethylbutyric acid, while representative carboxylic esters include methyl formate and methyl acetate.

Aliphatic ethers that can be used include dimethyl ether, methyl ethyl ether, ethyl ether and 1,2-dimethoxy ethane. Acetals such as dimethoxy methane and ketals such as 2,2-dimethoxy propane can also be used in the invention.

Aliphatic amines and nitriles can also be used as the organic solvent in the present process, including, for example, hexyl amine, N,N'-dimethylbutyl amine, acetonitrile and acrylonitrile.

Among the many solvents which can be used in the instant invention as components of the replacement liquid, alcohols having from 1 to 8 carbon atoms and nitriles having 2 or 3 carbon atoms have been found to be particularly satisfactory.

In the present process, the membrane wet with an aqueous liquid is contacted with a replacement liquid under conditions such that the Permeation Factor is within specified limits. The Permeation Factor, $p$, is a function of several readily definable characteristics of the system, and is determined by the formula $$p = \gamma^2 \cdot f^2 \cdot \eta \overline{V},$$

wherein $\gamma$ is the ratio of the surface tension of the membrane wetting liquid to that of water (72.8 dynes per centimeter) at 20° C., $f$ is the mole fraction of the organic solvent in the replacement liquid, $\eta$ is the viscosity of the organic solvent in centipoise at 20° C., and $\overline{V}$ is the molar volume of the organic solvent in cubic centimeters per mole at 20° C. The quantity $\eta\overline{V}$ is assigned a value of 181 in all cases in which it exceeds this value, since it has been found that all organic solvents having $\eta\overline{V}$ values greater than about 181 are substantially equivalent in their effect on the gas permeation properties of dry membranes obtained by processes in which they are employed in replacement liquids in equal mole fractions.

When two or more organic solvents are present in the replacement liquid, the algebraic sum of the products of the viscosities and the gram-molar volumes is used, that is, $f_1 \cdot \eta_1\overline{V}_1 + f_2 \cdot \eta_2\overline{V}_2 \ldots f_n\eta_n\overline{V}_n$ where $f_1$, $f_2$ and $f_n$ are the mole fractions of the components involved and $\eta_1\overline{V}_1$, $\eta_2\overline{V}_2$ and $\eta_n\overline{V}_n$ are the products of the viscosities and molar volumes of the organic solvents. In other words, the equation for the Permeation Factor rewritten in expanded form is $p = \gamma^2 \cdot f^2 \cdot [f_1\eta_1\overline{V}_1 + f_2\eta_2\overline{V}_2 \ldots + f_n\eta_n\overline{V}_n]$, where $f$ is the sum of $f_1, f_2 \ldots + f_n$.

The Permeation Factor should be less than or equal to 50 for each step in the water-removal phase of the present process when the contacting temperature is between 20° and 50° C. However, when the temperature of contact is about from 20° C. to −50° C., the Permeation Factor should be less than or equal to 100 − 2.5 T, where T is the temperature of contact in degrees centigrade. Particularly high flux in the dry membrane has been obtained when the Permeation Factor in each step is less than about 30, and especially when the Permeation Factor is less than about 20 for each step in which the water-wet membrane is contacted with replacement liquid.

This invention provides a balance of parameters which have been found to be operative in causing reductions in gas permeabilities of certain permselective membranes dried by other processes in which aqueous membrane liquids are replaced by nonaqueous liquids. These parameters apparently involve a balancing of the rates at which nonaqueous components of the replacement liquids are introduced into the membranes and the rates at which water is removed from the membranes. The invention process employs, in the replacement liquids, organic solvents which penetrate into membrane structures wet with aqueous liquids. The particular process of this invention employs organic solvents which penetrate rapidly into the membrane to produce a membrane wetting liquid having a reduced surface tension. This process further employs such solvents in each replacement liquid in a concentration such that the rate of water removal from the membrane does not exceed a rate, represented by the Permeation Factor, dependent upon the surface tension of the membrane wetting liquid and the viscosity and molar volume of the organic solvent. Moreover, as indicated by the temperature correction factor for the Permeation Factor, substantially higher concentrations of organic solvents having relatively high viscosities and large molar volumes can be accommodated in replacement liquids employed at lower temperatures.

In calculating Permeation Factors, the surface tension of the membrane wetting liquid can be assumed to be substantially equal to that of the aqueous liquid with which the membrane is last contacted. In the event that the surface tension of the last contacting liquid is unknown, the surface tension of the membrane wetting liquid can be determined by the following steps:

(1) Removing excess liquid adhering to the membrane by blotting, as with a paper towel, or by shaking or centrifuging off the excess liquid;

(2) Heating the membrane at 120° C. for 3 hours in a vacuum oven equipped with means for conveying the evolved vapors out of the oven;

(3) Passing the vapors into and condensing the vapors in trap maintained at −70° C. or below, as by cooling with a solid carbon dioxide-acetone mixture; and (4) Analyzing the collected sample for its composition and determining the surface tension by comparison with known data relating surface tension and composition or by measuring its surface tension using a du Nouy tensiometer, as described by Reilly and Roe, Physicochemical Methods, 4th Ed., Vol. 1, pages 520–525, Von Nostrand Co., Inc., New York, 1943.

The contacting of liquid-wet membranes with a replacement liquid can be carried out by any convenient means, including immersing, dipping, or spraying the liquid-wet membrane so that it is contacted with the replacement liquid, preferably in a series of discrete steps. The replacement liquid can also be added to a treating bath in which the membrane is submerged, with two or more steps merging into a continuous process when the addition is made over a period of time.

Organic solvents having the characteristics described above and also having products of their viscosities and molar volumes less than the Permeation Factor limit for the process involved can be employed in substantially anhydrous condition in removing water from water-wet membranes. Such solvents having products of their viscosity and molar volume below about 50 are therefore useful when substantially anhydrous at temperatures of 20° C. to 50° C. include methanol; aliphatic nitriles having 2 or 3 carbon atoms such as acetonitrile, propionitrile and acrylonitrile; alkyl alkanoates having 2 or 3 carbon atoms, such as methyl formate, ethyl formate, and methyl acetate; and ethers such as ethyl ether and methylal. Similarly, if the surface tension of the membane-wetting liquid is below about 7.2 dynes per centimeter or if the temperature of contacting is below 20° C., higher molecular weight organic solvents such as ethanol and isopropanol can be used as water replacement liquids in an anhydrous condition while satisfying the Permeation Factor. In such processes, the water-wet membrane is contacted one or more times with the water replacement liquid until the membrane is substantially free of water.

The preferred organic solvents and their respective amounts employed in a process of this invention in which water is replaced in a series of steps depend upon the Permeation Factors of the various steps. Thus, it has been found that the flux of dry gas separation membranes obtained by this process is largely fixed by the water replacement step which has the highest Permeation Factor and that it is desirable to have the Permeation Factor be largest in the replacement step which results in substantially complete removal of water from the membrane.

Organic solvents having relatively high viscosities and large molar volumes can be employed in replacement liquids at low mole fractions in the instant process without exceeding the Permeation Factor limits. Thus, a water-wet membrane can be contacted in a first step with a replacement liquid containing a low mole fraction (e.g., 0.2 or less) of an organic solvent having a high viscosity and a large molar volume which is effective in reducing the surface tension of the membrane-wetting liquid and then can be contacted in a second and later step with replacement liquids containing larger mole fractions of one or more other organic solvents having lower viscosities and smaller molar volumes to replace increasingly large fractions of the water remaining in the membrane liquid. Representative of organic solvents useful in such first-step replacement liquids because they are effective in reducing the surface tension of water are alcohols containing 4 to 8 carbon atoms such as n-butanol and n-hexanol. Moreover, when the surface tension of the membrane liquid is reduced to less than about 35 dynes per centimeter and preferably 30 dynes/cm. or less, the required Permeation Factor can generally be obtained by contacting the liquid-wet membrane in a last water-removing step with any anhydrous liquid which meets the other requirements for a replacement liquid, e.g., an alcohol containing one to three carbon atoms and preferably methanol.

Particularly satisfactory results are obtained when the concentration of the organic solvent in a treating bath is continuously increased during treatment, so as to give an initially low Permeation Factor, followed by substantially complete water replacement when the concentration of the non-aqueous components of the replacement liquid reaches substantially 100%. In such processes, it is convenient to continuously remove fluid from the treatment vessel, so as to maintain a substantially constant bath volume.

Still another method of bringing into contact a water replacement liquid and the water-wet membrane involves countercurrently contacting the membrane with the replacement liquid, thus establishing a continuum in the concentration of the water in the membrane from the point at which it initially contacts the replacement liquid to the final point of contact.

The proportion of replacement liquid to membrane water can vary widely. In general, in any one contact about from 1 to 500, more usually 10 to 200, volumes of replacement liquid per molume of membrane water are used. While larger and smaller volumes can be used in any particular step, they are not always convenient to handle. As with extractions in general, a multiplicity of extractions at convenient to handle volume ratios are more efficient than a single extraction involving a relatively large volume ratio. The period that the liquid-wet membrane should be contacted with a replacement liquid will vary with the types and concentration of the organic solvent in the replacement liquid, and will generally be adjusted to obtain substantial equilibrium between the membrane liquid and the replacement liquid. Substantially complete equilibrium is generally obtained in about from 1 to 24 hours of immersion but excellent results can be obtained in shorter contact times.

In contacting a liquid-wet membrane with replacement liquid, the removal of water can be facilitated by the presence of an adsorbent. Such adsorbents can include desiccants, including those that form hydrates or alcoholates, such as sodium sulfate, natural clays, diatomaceous earth, silica or alumina gel. Particularly satisfactory synthetic desiccants are those molecular sieves commercially available from the Linde Division of Union Carbide Corporation as Types 3A, 4A and 5A, as well as those described by Hersh in "Molecular Sieves," Reinhold, New York (1961).

The instant invention process includes removing the replacement liquid after substantially complete removal of water from the originally water-wet membrane. The usual technique for removing the replacement liquid is to contact the liquid-wet membrane with another organic solvent or a series of solvents in one or more steps and thereby obtain the membrane wet with a liquid which can be evaporated without significant effect on the permselective properties of the resulting dry membrane and then to evaporate the liquid by conventional techniques at atmospheric or reduced pressure.

Liquids which can be so evaporated typically have low surface tension, are non-polar and water-immiscible, and are capable of penetrating the membrane. They thus generally have a surface tension less than about 35 dynes per centimeter, a hydrogen bonding parameter less than about 3.0 (calories per cubic centimeter)$^{\frac{1}{2}}$, and an internal pressure less than about 100 calories per cubic centimeter. The internal pressures of organic solvents can be measured directly or can be estimated from the dispersion and polar components of three-dimensional solubility parameters as described by Bagley, Nelson, and Scigliano in The Journal of Paint Technology, Volume 43, pages 35 to 42, 1971, employing solubility parameter values such as those tabulated by Hansen and Beerbower and by Barton in the references cited above. Examples of these liquids include benzene, carbon disulfide, methylene chloride, chloroform, carbon tetrachloride, 1,2-dichloroethane, 1,1,1-trichloroethane, and trichloroethylene.

Such liquids preferably have a surface tension less than about 25 dynes per centimeter, a hydrogen bonding parameter less than about 1.0 (calories per cubic centimeter)$^{\frac{1}{2}}$, and an internal pressure less than about 70 calories per cubic centimeter. Examples include aliphatic and cycloaliphatic hydrocarbons having from 4 to 8 carbon atoms and chlorofluorocarbons having 1 to 3 carbon atoms, including 1,2-dichloro-1,1,2,2-tetrafluoroethane. Of these, 1,1,2-trichloro-1,2,2-trifluoroethane ("Freon" 113) has been found to give particularly satisfactory results.

A useful dry membrane can be obtained by evaporating the water replacement liquid of the last water replacing step in the process when such evaporation has a sufficiently small effect on the permselective separation properties of the resulting dry membrane.

The instant process results in the drying of water-wet permselective membranes of high surface tension polymers without destruction of the structural features critical to their selective properties. Accordingly, the dried membranes are particularly effective in the separation of gaseous mixtures, with excellent permeation rates and selectivities. Representative of such gaseous mixtures are those found in a wide variety of industrial exhaust streams. For example, the membranes resulting from the instant process can be used to markedly increase the concentration of hydrogen in mixtures of hydrogen, nitrogen, methane, argon and ammonia typically resulting from the synthesis of ammonia. In addition, the dry membranes can be used for the separation of hydrogen and carbon monoxide, helium from natural gases such as air, hydrogen from petrochemical process streams, oxygen from air, and, in general, the separation of one rapidly diffusing gas from less permeable gases.

The invention is further illustrated by the following specific examples, in which weights and percentages are by weight unless otherwise indicated.

The polymer used for the preparation of Membrane A in the Examples was prepared by reacting a mixture of 70 parts of isophthaloyl chloride and 30 parts of terephthaloyl chloride with a substantially stoichiometric amount of a mixture of 80 parts of metaphenylenediamine and 20 parts of the calcium salt of metaphenylenediamine-4-sulfonic acid in dimethyl acetamide solution. This polymer was spun into hollow fiber form. The preparation and spinning were substantially as described in Chen et al. U.S. Pat. No. 3,886,066, Example 1, except that the spinning conditions were modified to give hollow fibers with an outside diameter of 80 microns and an inside diameter of 43 microns. The resulting membranes were kept wet with water until used in the drying processes described herein.

A portion of polymer prepared as described above was dissolved in dimethylacetamide and the resulting solution was cast as a 0.037 centimeter thick film on a glass plate. The plate and film were heated on a hot plate at 80° C. for 2 hours and then in an over at about 50° C. under reduced pressure for about 16 hours to evaporate substantially all the solvent. The resulting film, about 0.004 centimeters thick, had a Critical Surface Tension of 43.8 dynes per centimeter at 23° C., determined as described above.

The polymer for Membrane B was prepared from a mixture of 70 parts of isophthaloyl chloride and 30 parts of terephthaloyl chloride and a substantially stoichiometric amount of a mixture of 67 parts of metaphenylene diamine and 33 parts of metaphenylenediamine-4-sulfonic acid substantially as described by Magat in U.S. Pat. No. 3,184,436, Example 10. In preparing Membrane B, a dimethylacetamide solution of the polymer and solubilizing salts was cast onto a polymeric belt and passed through a heated air drying chamber, a cooling chamber, and then through a water bath to remove substantially all the salts and the remaining solvent. The thickness of the resulting asymmetric film membrane was about 0.01 centimeters. It contained about 0.009 grams of water per square centimeter and was kept water-wet until used.

The polymer for Membrane C was prepared substantially as described by Richter et al. on U.S. Pat. No. 3,567,632 at column 28, line 61. A mixture of 70 parts of isophthaloyl chloride and 30 parts of terephthaloyl chloride was added over about 2 hours to a stirred and cooled solution in dimethylacetamide of a substantially stoichiometric amount of metaphenylenediamine. The polymer was end-capped with a small amount of benzoyl chloride. The resulting polymer was isolated by pouring the polymerization solution into rapidly stirred water. The separated polymer was washed acid-free with water and then rinsed with methanol and dried. In preparing Membrane C, a dimethylacetamide solution containing 15 weight percent of this polymer and 40 weight percent lithium nitrate (based on the weight of the polymer present) was cast as a 0.037 centimeter thick film on a glass plate. The plate was heated for 10 minutes on a hot plate maintained at 100° C. and the thus partially dried film was quenched and washed substantially free of salt and residual solvent by immersing the plate and film in water at 20° to 23° C. The resulting water-wet asymmetric film membrane was 0.012 centimeters thick and contained 0.008 grams of water per square centimeter. It was kept water-wet until used.

The gas separation permeation properties of the dried hollow fiber membranes described herein were determined with a single loop of a 150-fiber skein 18 inches long (making 300 fibers, each 9 inches long, as the arms of a U-tube) sealed into a metal tube having facilities for flushing with test gas and for collecting gas from the open bores of the hollow fiber membranes. The cell was first flushed with helium and the equilibrium rate of helium permeation through the membrane was determined at ambient temperature with an applied pressure of 400 psig. The cell was then flushed with nitrogen and the equilibrium rate of nitrogen permeation was determined with the same applied pressure. The observed permeation rates in seconds per cubic centimeter were converted into nano-Gas Transmission Rate (nGTR) units (cubic centimeters of gas permeated per second per square centimeter of effective membrane area per centimeter mercury of gas pressure $\times 10^{-9}$) assuming the effective area of the fiber membranes to be the logarithmic means of the outside and inside diameters. Selectivities for separating helium from nitrogen (helium/nitrogen) were calculated as the ratios of the observed permeation rates.

The gas separation permeation properties of dry film membranes were determined under substantially the same conditions as above with a circular portion of each membrane having an area of approximately 10 square centimeters mounted in a conventional pressure cell.

EXAMPLES 1-3, 5-6 AND COMPARATIVE EXAMPLES A-C

Portions of hollow fiber membrane A weighing about 0.5 gram on a dry basis and wet with water (about 0.7 to 1.4 grams) were suspended as a vertical loop of a 150-fiber skein about 140 centimeters long, supporting a 1.56 gram weight, inside 100-milliliter calibrated burettes having an internal diameter of approximately 13.5 millimeters. The burettes were filled at ambient temperature (20°-25° C.) with about 110 milliliters of each of the organic solvents listed in Table I, immersing the hollow fiber membrane loops and providing about 160 to 80 volumes of solvent for each volume of water in the membranes. After soaking the membranes in the treating liquids for 15 or 30 minutes each, the burettes were drained and the soakings were repeated two more times. The total contact time between the membrane and the treating liquid for this first portion of the process is given in Table I for each example. The burettes were then drained and refilled with 1,1,2-trichloro-1,2,2-trifluoroethane ("Freon" 113) at 20°-25° C., again using 3 rinses of equal duration. The total contact time of the membrane in the liquid for this second portion of the process is also given in Table I. After draining the burettes, the liquids remaining adherent to the membranes were evaporated at 25° C. overnight under reduced pressure. The length of each membrane skein was again noted and the percent shrinkage in length noted in the table was calculated. The gas separation properties of the resulting dry membranes were determined as described above. The Helium Flux in nGTR units, cc(NTP)/sec. cm$^2$·cm Hg·10$^{-9}$, as well as the He/N$_2$ selectivity ratio are shown in Table I. Minor deviations from these procedures are noted in footnotes to the table.

EXAMPLE 4

Portions of the water-wet hollow fiber membrane A weighing about 0.5 g on a dry basis were wound loosely around a 3.5 cm diameter glass cylinder, immersed in 650 cc of methyl acetate cooled to −20° C., which was allowed to warm up to room temperature (25° C.) overnight, immersed in 650 cc "Freon" 113 at 25° C. for 2 hours, and finally dried at 25° C. overnight under reduced pressure. The results are reported in Table I.

EXAMPLES 7-41 AND COMPARATIVE EXAMPLES D-K

Portions of water-wet hollow fiber membrane A were dried as in the procedure of the examples reported in Table I except that each hollow fiber membrane portion was immersed in one to four mixtures of water and an organic solvent in the proportions shown in Tables II and III, and finally in a water-free solvent as indicated in Tables II and III before immersion in "Freon" 113. Each immersion was for a 45 minute period, except as noted in Table III, and the quantity of replacement liquid was about 160 to 80 volumes per gram of water in the fiber. The gas separation properties of the dried membranes were determined; the results are reported in Tables II and III.

EXAMPLES 42-43

Portions of water-wet hollow fiber membrane A above weighing about 0.5 g on a dry basis were dried by immersing the water-wet hollow fibers in 25° C. 500 cc portions of the treating liquids reported in Table III, 70 grams of molecular sieve 3A being added to the water-free treating liquid to further promote removal of water from the membrane, then immersing the hollow fibers in 25° C. "Freon" 113, the contact time being given in Table III, and finally evaporating as described previously.

EXAMPLE 44

The miltistep water-removal procedure of Examples 38-39 was repeated, except that the water-wet fiber on a standard size bobbin. Water-wet hollow fiber membrane A, as a continuous skein of 150 fibers, was wound with a moderate tension onto a plastic core about 6 centimeters in diameter and 15 cm long, weighing about 35 grams and constructed with 19 rings supported by 11 flexible spaced apart ribs between rings, thereby forming an open cage-like cylinder axially compressible to a length of 10 cm, employing lay-down angles about from 70 and 84 degrees to build up a self-supporting bobbin about 14 cm in diameter and 15 cm long containing about 900 meters of the hollow fiber skein and weighing about 833 grams. The membrane was first contacted with water saturated with n-butanol under conditions that provided a Permeation Factor of 0.018. Contact was maintained for 20 hours at 25° C., with stirring, transferred and stored overnight in 4 liters methanol, then finally dried by contacting with 4 liters "Freon" 113, stored overnight over Linde 5A sieves, and evaporating as in Examples 1-3. The resulting membrane were tested and exhibited the following properties:

He flux (nGTR): 54.3 M
He/$N_2$ selectivity: 50

EXAMPLES 45-49 AND COMPARATIVE EXAMPLES L-N

The procedure of Examples 1-6 was repeated, except that the alcohol was preheated or precooled to the temperature indicated below along with the resulting membrane properties.

| | | Effect of Temperature on Membrane Flux | | | | |
|---|---|---|---|---|---|---|
| Ex. | Alcohol | Temp. °C | (100-2.5T) | p | Flux, nGTR | Selectivity |
| 45 | MeOH | 50[a] | −25 | 24 | 33.5 M | 59 |
| 46 | MeOH | 50[b] | −25 | 24 | 22.9 M | 56 |
| 47 | MeOH | −10 | 125 | 24 | 64.1 M | 21 |
| 48 | EtOH | −10 | 125 | 69.9 | 2.5 M | 20 |
| L | i-PrOH | −10 | 125 | 181 | 1.6 M | 3 |
| M | i-PROH | −20 | 150 | 181 | 2.9 M | 15 |
| N | i-PrOH | −30 | 175 | 181 | 14.5 M | 12 |
| 49 | i-PrOH | −40 | 200 | 181 | 87.1 M | 12 |

[a]Wet fiber at 25°, alcohol at 50°.
[b]Wet fiber at 50°, alcohol at 50°.

EXAMPLE 50

The miltistep water-removal procedure of Examples 38-39 was repeated, except that the water-wet fiber was first contacted with water saturated with n-hexanol to give a Permeation Factor of 0.0009, for 2 days at 25° C. The membrane was then given two soakings of 15 min. each in methanol preheated to 50° C. to give a Permeation Factor of 3.3 for the first soaking and a substantially lower Permeation Factor for the second soaking. The membrane was finally dried by contacting with "Freon" 113 and evaporating as described previously.

The resulting membrane showed the following properties:

% linear shrinkage: 5.5
He flux (nGTR): 114.6 M
He/$N_2$ selectivity: 39

EXAMPLE 51

A portion of water-wet hollow fiber membrane A was suspended in a burette as in Example 1. The burette was filled at ambient temperature with methylal [$(CH_3O)_2CH_2$] as the water replacement liquid (Permeation Factor 29.3). After about one hour, the burette was drained and refilled with a second portion of methylal. After about another hour, the burette was drained and refilled with a third portion of methylal. After about another hour the burette was drained and residual liquid was evaporated at 25° C. overnight under reduced pressure. The resulting dry membrane had a helium permeability flux of 9.7 M nGTR units and a helium/nitrogen selectivity of 14.

EXAMPLE 52

A portion of water-wet hollow fiber Membrane A weighing about 0.5 gram on a dry basis was wound on a glass cylinder as in Example 4 and immersed in about 650 milliliters of diethyl ether as the water replacement liquid (Permeation Factor 25.4), cooled to −50° C., which was allowed to warm to room temperature overnight. The membrane was removed from the resulting liquid and residual liquid was evaporated under reduced pressure. The resulting dry membrane had a helium permeability flux of 43.6 M nGTR units and a helium/nitrogen selectivity of 38.

EXAMPLES 53-57

Portions of water-wet hollow fiber membrane A, weighing 0.5 g on a dry basis, were dried by the general procedure of Example 11. The membranes were immersed for 15 minutes in the aqueous methanol, for 15 minutes in the anhydrous methanol, then for 18 hours in a nonpolar solvent tabulated below followed by solvent evaporation under reduced pressure.

| Ex. | Nonpolar Solvent | He Flux nGTR | Selectivity He/N$_2$ |
|---|---|---|---|
| | Nonpolar Solvent Use in Multistage Drying with Methanol | | |
| 53 | n-pentane | 72.6 M | 50 |
| 54 | n-heptane | 62.2 M | 126 |
| 55 | carbon disulfide | 11.2 M | 79 |
| 56 | benzene | 7.8 M | 46 |
| 57 | carbon tetrachloride | 7.4 M | 10 |

EXAMPLE 58

Water-wet hollow fiber membrane A was wound on bobbins as in Example 44.

Three such bobbins were mounted onto a closed-end pipe, perforated in zones within the bobbin cores and gasketted to the cores to prevent circulation of liquids other than through the perforations in the pipe and the cores, inside a cylindrical treating vessel about 15 cm in diameter and 40 long and having a volume of about 7 liters; associated with the vessel was a circulating system having a volume of about 2 liters.

The vessel was filled with deionized water at about 20° C. and this water was circulated at a rate of about 25 liters per minute upward through the perforated pipe and outward through the perforated cores and the hollow fiber bobbins while the contents of the vessel overflowed. Commercial anhydrous methanol at about 20° C. was introduced into the circulating liquid at a rate of about 2.9 liters per minute for about 7 minutes, thus introducing into the system about 2.57 volumes of methanol for each volume of the vessel and circulatory system combined, while an equal volume of the circulating liquid was removed at a point before the point at which the methanol was introduced. Circulation of the liquid was stopped and the contents of the system were drained. These contents contained 13.2% water by weight. The Permeation Factor, based on the assumption that the membrane liquid was water and that the replacement liquid had a final concentration of about 86.8% methanol, was not more than 1.6 during the entire process.

Commercial anhydrous methanol was pumped at a rate of about 25 liters per minute through the perforated pipe to fill the system with a first methanol rinse. The rinse liquid was circulated for about 20 minutes and then drained. The first methanol rinse drainings contained 4.42% water by weight.

Methanol was again pumped through the perforated pipe to fill the system with a second methanol rinse. The rinse liquid was circulated for about 20 minutes and then sampled. The second methanol rinse sample contained 1.90% water by weight. The Permeation Factors for the first and second rinses were not more than 1.9 and 2.1, respectively, based on the same assumptions as for the original replacement liquid.

The total time of contact between the hollow fiber membranes and methanolic liquids was about 83 minutes.

With the second methanol rinse circulating through the system, "Freon" 113 was pumped into the circulating liquid at a rate of about 0.3 liters per minute for about 64 minutes, thus introducing into the system about 2.45 volumes of "Freon" 113 for each volume of the vessel and the circulatory system, while removing an equivalent volume of the circulating liquid from the system. The contents of the system were then drained.

These contents contained 5.7% methanol and 0.25% water by weight.

"Freon" 113 was pumped at a rate of about 25 liters per minute through the perforated pipe to fill the system with a first "Freon" 113 rinse. The rinse liquid was circulated for about 30 minutes and then drained. The first "Freon" 113 rinse drainings contained 1.12% methanol and 0.07% water by weight.

"Freon" 113 was again pumped through the perforated pipe to fill the system with a second "Freon" 113 rinse. The rinse liquid was circulated for about 30 minutes and then drained. The second "Freon" 113 rinse drainings contained 0.48% methanol and 0.04% water by weight.

The average temperature of the "Freon" 113 rinse was 21° C. The bobbins of hollow fiber membranes wet with "Freon" 113 were removed from the treating vessel and the "Freon" 113 was evaporated in an oven (volume about 43 liters) at 59° C. and 15 millimeters of mercury vacuum over about 21 hours during which N$_2$ was passed through the oven at a rate of about 10 liters per hour. The three dry bobbins and their cores each weighed 333 grams.

Portions of the outer section dry membranes showed the following properties:

| | Flux, nGTR | He/N$_2$ Selectivity |
|---|---|---|
| Upper Bobbin | 71 M | 47 |
| Middle Bobbin | 51.5 M | 54 |
| Lower Bobbin | 62.6 M | 38 |

EXAMPLE 59

A portion of hollow fiber Membrane A weighing about 2.9 grams on a dry basis (about 813 centimeters of a 150-fiber skein) and wet with about 4.1 grams of water was suspended as a bundle of vertical loops about 40 centimeters long inside a 25 milliliter burette. Two hundred milliliters of anhydrous isopropanol was dripped onto and flowed over the bundle of membrane loops from top to bottom at a substantially uniform rate over about 2 hours. The liquid accumulated from the bottom of the burette over different periods was analyzed:

| Time, minutes | Liquid accumulated, ml/min | Percent water, by weight |
|---|---|---|
| 0–2 | 0 | — |
| 2–6 | 1.33 | 73.2 |
| 10–14 | 1.2 | 11.7 |
| 20–24 | 1.13 | 0.8 |
| 80–84 | 1.53 | 0.09 |
| 119–121 | 6.0 | 0.08 |

The Permeation Factor was largest with the first drop contacting the top of the bundle and thereafter decreased rapidly. For example, the Permeation Factor would have been 9.6 upon contacting the lower 30 centimeters of the bundle uniformly with the liquid obtained upon contacting the upper 10 centimeters (containing about one gram of water) with one gram of isopropanol. Similarly, the Permeation Factor would have been 1.8 upon contacting the water-wet bundle with the mixture of 73.2% water and 26.8% isopropanol collected in the 2 to 6 minute period. After the hollow fiber membrane bundle was thus contacted with isopropanol, 300 milliliters of "Freon" 113 was similarly dripped onto and flowed over the bundle over 1 hour.

The liquid accumulated from the bottom of the burette over different periods was analyzed:

| Time, Minutes | Liquid Accumulated, ml/min | Percent by Weight | |
|---|---|---|---|
| | | "Freon" 113 | Isopropanol |
| 0–1 | 0 | — | — |
| 1–2 | 5 | 48.9 | 51.0 |
| 29–30 | 8 | 99.95 | 0.03 |

The residual liquid in the bundle was evaporated under reduced pressure. The resulting dry membrane had a helium permeability flux of 26.8 M nGTR units and helium/nitrogen selectivity of 31.

EXAMPLE 60 AND COMPARATIVE EXAMPLE P

Square sections of film Membrane B having areas of 58 square centimeters were immersed for 15 minutes in 200 milliliter portions of anhydrous methanol (Permeation Factor 24) in Example 60 and of anhydrous isopropanol (Permeation Factor 181.1) in Comparative Example P. The membranes were removed from these liquids and immersed again for 15 minutes in 200 milliliter portions of the same anhydrous alcohol (Permeation Factors 1.6 and 11.7). The alcohol-wet membranes were each then immersed for 15 minutes in sequence in two 200 milliliter portions of "Freon" 113 and the remaining solvent was evaporated. The areas of the dry membranes were measured and their permeation separation properties were determined:

| Example | Replacement Liquid | Dry Area, sq. cm. | Percent Shrinkage | Helium Flux, nGTR | Selectivity He/$N_2$ |
|---|---|---|---|---|---|
| 60 | Methanol | 51 | 12 | 4.8 M | 16 |
| P | Isopropanol | 25.8 | 56 | 0.32M | 2 |

EXAMPLE 61

A portion of film Membrane C having an area of 100 square centimeters was immersed for 15 minutes in 400 milliliters of anhydrous methanol (Permeation Factor 24) and then in a second portion of 400 milliliters of the same anhydrous alcohol (Permeation Factor 2.0). The alcohol-wet membrane was then immersed for 30 minutes in "Freon" 113 containing about 50 grams of Type 5A molecular sieves. The membrane was removed from the liquid and residual liquid was evaporated at 25° C. under reduced pressure. The resulting dry membrane had a helium permeability flux of 25.3 M nGTR units and a helium/nitrogen selectivity of 62.

EXAMPLE 62

Portions of water-wet fiber membranes prepared from the polymer of Membrane A but from a different spin were wrapped around a glass cylinder about 3 centimeters in diameter. The cylinder and wrapping membranes were immersed in about 1000 milliliters of commercial anhydrous methanol as the water replacement liquid (Permeation Factor 24). After about 6 hours at ambient temperature the resulting liquid was drained from the cylinder and membranes and they were immersed in a second similar volume of commercial anhydrous methanol. After 1 week at ambient temperature the resulting liquid was drained from the cylinder and wrapping membranes and they were immersed in about 1000 milliliters of methylene chloride. After 2 days at ambient temperature the resulting liquid was drained from the cylinder and wrapping membranes and the remaining adherent liquid was evaporated from membranes overnight under reduced pressure. The resulting dry hollow fiber membranes had a helium permeability flux of 8.6 M $n$GTR units and a helium/nitrogen selectivity of 340.

TABLE I

| Ex. | Solvent | Contact Time (Min) Portion 1 | Contact Time (Min) Portion 2 | Viscosity $\eta$ cp at 20° C | Molar Volume $\bar{V}$ | $\eta\bar{V}$ | $p^{(b)}$ | Percent Linear Shrinkage | He Flux nGTR | Selectivity He/$N_2$ |
|---|---|---|---|---|---|---|---|---|---|---|
| 1 | $(CH_3O)_2CH_2$ | 90 | 90 | 0.33 | 87.9 | 29.0 | 29.0 | | 45.4 $M^{(d)}$ | 7 |
| 2 | $CH_3CN$ | 45 | 90 | 0.383 | 52.4 | 20.1 | 20.1 | 13 | 21.8 M | 18 |
| 3 | $HCOOCH_3$ | 45 | 90 | 0.355 | 61.6 | 21.9 | 21.9 | 9.5 | 18.9 M | 348 |
| 4 | $CH_3COOCH_3^{(a)}$ | 1440 | 120 | 0.388 | 76.1 | 29.6 | 29.6 | | 19.8 M | 14 |
| 5 | MeOH | 45 | 45 | 0.593 | 40.5 | 24 | 24 | 10 | 14.5 M | 21 |
| 6 | $CH_3COCH_3$ | 45 | 90 | 0.331 | 73.4 | 24.3 | 24.3 | | 2 M | 25 |
| A | EtOH | 45 | 45 | 1.20 | 58.2 | 69.9 | 69.9 | 14.9 | 1 M | 30 |
| B | $CH_2{=}CH \cdot CH_2OH$ | 90 | 180 | 1.36 | 68 | 92.5 | 92.5 | 14 | 0.780 M | 51 |
| C | i-PrOH | 45 | 45 | 2.37 | 76.5 | 181.4 | 181 | 22 | 0.054 M | $^{(c)}$ |

$^{(a)}$initial temp. −20° C
$^{(b)}$The membrane liquid surface tension relative to water ($\gamma$) and the solvent concentration (f) are both 1.0 in all examples in this table.
$^{(c)}$Not measured.
$^{(d)}$The symbol "M" denotes thousands in the tables and examples herein.

TABLE II

| Ex. | Step | Water Replacement Liquid (Wt. Ratio) | f | $\gamma$ | $\gamma^2$ | $f^2$ | $\eta\bar{V}$ | p | Percent Linear Shrinkage | He Flux nGTR | Selectivity He/$N_2$ |
|---|---|---|---|---|---|---|---|---|---|---|---|
| 7 | 1 | 5/95 MeOH/$H_2O$ | 0.029 | 1.0 | 1.0 | .00084 | 24 | 0.02 | | | |
|   | 2 | MeOH | 1.0 | 0.833 | 0.694 | 1.0 | 24 | 16.7 | 9.1 | 15 M | 41 |
| 8 | 1 | 10/90 MeOH/$H_2O$ | 0.059 | 1.0 | 1.0 | .0035 | " | 0.08 | | | |
|   | 2 | MeOH | 1.0 | 0.757 | 0.573 | 1.0 | " | 13.8 | 9.2 | 16.1 M | 44 |
| 9 | 1 | 25/75 MeOH/$H_2O$ | 0.158 | 1.0 | 1.0 | .025 | " | 0.6 | | | |
|   | 2 | MeOH | 1.0 | 0.597 | 0.357 | 1.0 | " | 8.6 | 9.0 | 24.2 M | 38 |
| 10 | 1 | 40/60 MeOH/$H_2O$ | 0.273 | 1.0 | 1.0 | .075 | " | 1.8 | | | |
|    | 2 | MeOH | 1.0 | 0.507 | 0.257 | 1.0 | " | 6.2 | 10 | 24.2 M | 33 |
| 11 | 1 | 50/50 MeOH/$H_2O$ | 0.36 | 1.0 | 1.0 | .13 | " | 3.1 | | | |
|    | 2 | MeOH | 1.0 | 0.458 | 0.210 | 1.0 | " | 5 | 9.2 | 24.2 M | 43 |
| 12 | 1 | 60/40 MeOH/$H_2O$ | 0.458 | 1.0 | 1.0 | .21 | " | 5 | | | |
|    | 2 | MeOH | 1.0 | 0.419 | 0.176 | 1.0 | " | 4.2 | 9 | 22.9 M | 35 |
| 13 | 1 | 75/25 MeOH/$H_2O$ | 0.628 | 1.0 | 1.0 | .394 | " | 9.5 | | | |

TABLE II-continued

| Ex. | Step | Water Replacement Liquid (Wt. Ratio) | $f$ | $\gamma$ | $\gamma^2$ | $f^2$ | $\eta\bar{V}$ | $p$ | Percent Linear Shrinkage | He Flux nGTR | Selectivity He/N$_2$ |
|---|---|---|---|---|---|---|---|---|---|---|---|
| | 2 | MeOH | 1.0 | 0.383 | 0.147 | 1.0 | " | 3.5 | 9.3 | 24.2 M | 23 |
| 14 | 1 | 90/10 MeOH/H$_2$O | 0.835 | 1.0 | 1.0 | .697 | " | 16.7 | | | |
| | 2 | MeOH | 1.0 | 0.328 | 0.107 | 1.0 | " | 2.6 | 10 | 15.6 M | 32 |
| 15 | 1 | 50/50 MeOH/H$_2$O | 0.36 | 1.0 | 1.0 | .13 | " | 3.1 | | | |
| | 2 | 75/25 MeOH/H$_2$O | 0.628 | 0.458 | 0.210 | .394 | " | 2.0 | | | |
| | 3 | MeOH | 1.0 | 0.383 | 0.147 | 1.0 | " | 3.5 | 9 | 54 M | 40 |
| 16 | 1 | 25/75 MeOH/H$_2$O | 0.158 | 1.0 | 1.0 | .075 | " | 1.8 | | | |
| | 2 | 50/50 MeOH/H$_2$O | 0.36 | 0.597 | 0.357 | .13 | " | 1.1 | | | |
| | 3 | MeOH | 1.0 | 0.458 | 0.21 | 1.0 | " | 5 | 9.1 | 24 M | 38 |
| 17 | 1 | 25/75 MeOH/H$_2$O | 0.158 | 1.0 | 1.0 | .025 | " | 0.6 | | | |
| | 2 | Continuous addition | 0.484 | 0.597 | 0.356 | .234 | " | 2.0[b] | | | |
| | 3 | 3 vols. MeOH for | 0.709 | 0.406 | 0.165 | .503 | " | 2.0[b] | | | |
| | 4 | each step | 0.844 | 0.351 | 0.123 | .712 | " | 2.1[b] | | | |
| | 5 | MeOH+Mol. Sieve 3A | | | | | | | | | |
| 18 | i | 7 days' immersion[a] | | | | | | | | 90.8 M | 31 |
| | ii | 19 days' immersion[a] | | | | | | | | 145.2 M | 28 |
| 19 | 1 | 5/95 EtOH/H$_2$O | .02 | 1.0 | 1.0 | 0.0004 | 69.9 | .03 | | | |
| | 2 | EtOH | 1.0 | 0.789 | 0.622 | 1.0 | 69.9 | 43.5 | 11 | 2.6 M | 61 |
| 20 | 1 | 10/95 EtOH/H$_2$O | .042 | 1.0 | 1.0 | 0.0018 | " | 0.13 | | | |
| | 2 | EtOH | 1.0 | 0.672 | 0.452 | 1.0 | " | 31.6 | 9.6 | 4 M | 47 |
| 21 | 1 | 25/75 EtOH/H$_2$O | .115 | 1.0 | 1.0 | 0.0132 | " | 0.92 | | | |
| | 2 | EtOH | 1.0 | 0.479 | 0.230 | 1.0 | " | 16.1 | 7.4 | 9.7 M | 28 |
| 22 | 1 | 50/50 EtOH/H$_2$O | .281 | 1.0 | 1.0 | 0.0790 | " | 5.5 | | | |
| | 2 | EtOH | 1.0 | 0.396 | 0.157 | 1.0 | " | 11 | 6.5 | 25.6 M | 51 |
| 23 | 1 | 75/25 EtOH/H$_2$O | .54 | 1.0 | 1.0 | 0.2916 | " | 20.4 | | | |
| | 2 | EtOH | 1.0 | 0.351 | 0.123 | 1.0 | " | 8.6 | 7.8 | 7.9 M | 104 |
| 24 | 1 | 90/10 EtOH/H$_2$O | .779 | 1.0 | 1.0 | 0.6068 | " | 42.4 | | | |
| | 2 | EtOH | 1.0 | 0.324 | 0.105 | 1.0 | " | 7.3 | 11.5 | 1.7 M | 39 |
| A* | | EtOH | 1.0 | 1.0 | 1.0 | 1.0 | " | 69.9 | 14.9 | 1 M | 30 |
| D | 1 | 5/95 i-PrOH/H$_2$O | 0.016 | 1.0 | 1.0 | 0.00026 | 181.4 | 0.05 | | | |
| | 2 | i-PrOH | 1.0 | 0.625 | 0.391 | 1.0 | " | 70.9 | 16.3 | 1 M | 23 |
| E | 1 | 10/95 i-PrOH/H$_2$O | 0.032 | 1.0 | 1.0 | 0.00102 | " | 0.19 | | | |
| | 2 | i-PrOH | 1.0 | 0.556 | 0.309 | 1.0 | " | 56 | 14.1 | 1.2 M | 22 |
| 25 | 1 | 25/75 i-PrOH/H$_2$O | 0.097 | 1.0 | 1.0 | 0.00941 | " | 1.7 | | | |
| | 2 | i-PrOH | 1.0 | 0.431 | 0.185 | 1.0 | " | 33.6 | 10.3 | 4.8 M | 38 |
| 26 | 1 | 30/70 i-PrOH/H$_2$O | 0.114 | 1.0 | 1.0 | 0.0130 | " | 2.4 | | | |
| | 2 | i-PrOH | 1.0 | 0.417 | 0.174 | 1.0 | " | 31.6 | 8.3 | 8.1 M | 33 |
| 27 | 1 | 40/60 i-PrOH/H$_2$O | 0.166 | 1.0 | 1.0 | 0.0276 | " | 5 | | | |
| | 2 | i-PrOH | 1.0 | 0.382 | 0.146 | 1.0 | " | 26.5 | 7.5 | 16.1 M | 30 |
| 28 | 1 | 50/50 i-PrOH/H$_2$O | 0.23 | 1.0 | 1.0 | 0.0529 | " | 9.6 | | | |
| | 2 | i-PrOH | 1.0 | 0.347 | 0.121 | 1.0 | " | 21.9 | 5.2 | 25.6 M | 76 |
| 29 | 1 | 60/40 i-PrOH/H$_2$O | 0.31 | 1.0 | 1.0 | 0.0961 | " | 17.4 | | | |
| | 2 | i-PrOH | 1.0 | 0.338 | 0.114 | 1.0 | " | 20.7 | 5.2 | 36.5 M | 265 |
| 30 | 1 | 70/30 i-PrOH/H$_2$O | 0.411 | 1.0 | 1.0 | 0.1689 | " | 30.6 | | | |
| | 2 | i-PrOH | 1.0 | 0.324 | 0.105 | 1.0 | " | 19 | 5.8 | 27.2 M | 69 |
| 31 | 1 | 75/25 i-PrOH/H$_2$O | 0.473 | 1.0 | 1.0 | 0.2237 | " | 40.6 | | | |
| | 2 | i-PrOH | 1.0 | 0.319 | 0.102 | 1.0 | " | 18.5 | 9.8 | 5.6 M | 51 |
| F | 1 | 20/20 i-PrOH/H$_2$O | 0.545 | 1.0 | 1.0 | 0.2970 | " | 53.9 | | | |
| | 2 | i-PrOH | 1.0 | 0.318 | 0.101 | 1.0 | " | 18.3 | 11.1 | 3.6 M | 23 |
| G | 1 | 85/15 i-PrOH/H$_2$O | 0.629 | 1.0 | 1.0 | 0.3956 | " | 71.8 | | | |
| | 2 | i-PrOH | 1.0 | 0.313 | 0.098 | 1.0 | " | 17.8 | 14.9 | 1.4 M | 18 |
| H | 1 | 90/10 i-PrOH/H$_2$O | 0.729 | 1.0 | 1.0 | 0.5314 | " | 96.4 | | | |
| | 2 | i-PrOH | 1.0 | 0.306 | 0.093 | 1.0 | " | 16.9 | 17.5 | .130 M | — |
| C** | | i-PrOH | 1.0 | 1.0 | 1.0 | 1.0 | " | 181.4 | 22 | .054 M | — |
| 32 | 1 | 50/50 i-PrOH/H$_2$O | 0.23 | 1.0 | 1.0 | 0.0529 | " | 9.6 | | | |
| | 2 | 75/25 i-PrOH/H$_2$O | 0.473 | 0.347 | 0.121 | 0.2237 | " | 4.9 | | | |
| | 3 | i-PrOH | 1.0 | 0.319 | 0.102 | 1.0 | " | 18.5 | 5.4 | 72 M | 35 |
| 33 | 1 | 25/75 i-PrOH/H$_2$O | 0.097 | 1.0 | 1.0 | 0.00941 | " | 1.7 | | | |
| | 2 | 50/50 i-PrOH/H$_2$O | 0.23 | 0.431 | 0.186 | 0.053 | " | 1.8 | | | |
| | 3 | i-PrOH | 1.0 | 0.347 | 0.121 | 1.0 | " | 21.9 | 5.1 | 24 M | 35 |
| 34 | 1 | 25/75 i-PrOH/H$_2$O | 0.097 | 1.0 | 1.0 | 0.00941 | " | 1.7 | | | |
| | 2 | 50/50 i-PrOH/H$_2$O | 0.23 | 0.431 | 0.186 | 0.053 | " | 1.8 | | | |
| | 3 | 75/25 i-PrOH/H$_2$O | 0.473 | 0.347 | 0.121 | 0.2237 | " | 4.9 | | | |
| | 4 | i-PrOH | 1.0 | 0.319 | 0.102 | 1.0 | " | 18.5 | 5.2 | 72 M | 32 |

[a]Followed by 50/50 MeOH/"Freon"-113, then 3-4 days in "Freon"-113 + Mol. Sieve 5A;
[b]Maximum value assuming step-wise addition
*Control from Table I, p > 50
**Control from Table I, p > 50

TABLE III

| Ex. | Step | Water Replacement Liquid (Wt. Ratio) | Min. Immersion | $f$ | $\gamma$ | $\gamma^2$ | $f^2$ | $\eta\bar{V}$ | $p$ | Percent Linear Shrinkage | He Flux nGTR | Sel. He/N$_2$ |
|---|---|---|---|---|---|---|---|---|---|---|---|---|
| 35 | 1 | 50/50 CH$_3$CN/H$_2$O | 60 | 0.305 | 1.0 | 1.0 | 0.0930 | 20.1 | 1.9 | | | |
| | 2 | CH$_3$CN | 60 | 1.0 | 0.407 | 0.1656 | 1.0 | 20.1 | 3.3 | 8 | 39.6 M | 35 |
| | 3 | "Freon" 113 | 90 | | | | | | | | | |
| 36 | 1 | 50/50 CH$_3$COCH$_3$/H$_2$O | 60 | 0.237 | 1.0 | 1.0 | 0.0562 | 24.3 | 1.4 | | | |
| | 2 | CH$_3$COCH$_3$ | 60 | 1.0 | 0.378 | 0.1427 | 1.0 | 24.3 | 3.5 | 9 | 11.5 M | 16 |
| | 3 | "Freon" 113 | 90 | | | | | | | | | |
| 37 | 1 | Wet (CH$_3$O)$_2$CH$_2$ | 30 | 0.104 | 1.0 | 1.0 | 0.0109 | 23.9 | 0.26 | | | |
| | 2 | (CH$_3$O)$_2$CH$_2$ | 90 | 1.0 | 0.293 | 0.086 | 1.0 | 23.9 | 2.0 | 7 | 43.3 M | 8 |
| | 3 | "Freon" 113 | 90 | | | | | | | | | |
| 38 | 1 | 7/93 n-BuOH/H$_2$O | 120 | 0.018 | 1.0 | 1.0 | 0.00032 | >181 | 0.09 | | | |
| | 2 | i-PrOH | 90 | 1.0 | 0.3958 | 0.1567 | 1.0 | 181 | 28.4 | | 29.1 M | 220 |

TABLE III-continued

| Ex. | Step | Water Replacement Liquid (Wt. Ratio) | Min. Immersion | f | $\gamma$ | $\gamma^2$ | $f^2$ | $\eta \bar{V}$ | p | Percent Linear Shrinkage | He Flux nGTR | Sel. He/$N_2$ |
|---|---|---|---|---|---|---|---|---|---|---|---|---|
|  | 3 | "Freon" 113 | 90 |  |  |  |  |  |  |  |  |  |
| 39 | 1 | 7/93 n-BuOH/$H_2O$ | 2160 | 0.018 | 1.0 | 1.0 | 0.00032 | >181 | 0.09 |  |  |  |
|  | 2 | i-PrOH | 90 | 1.0 | 0.3958 | 0.1567 | 1.0 | 181 | 28.4 | 6.2 | 72.6 M | 130 |
|  | 3 | "Freon" 113 | 120 |  |  |  |  |  |  |  |  |  |
| 40 | 1 | 1/99 n-$C_6H_{13}NH_2$/$H_2O$ | 2880 | 0.0018 | 1.0 | 1.0 | 0.0000032 | 104 | 0.00033 |  |  |  |
|  | 2 | i-PrOH | 90 | 1.0 | 0.3347 | 0.1120 | 1.0 | 181 | 20.3 |  | 14 M | 28 |
|  | 3 | "Freon" 113 | 90 |  |  |  |  |  |  |  |  |  |
| I | 1 | 30/70 $HOCH_2CH_2OH$/$H_2O$ | 15 | 0.1105 | 1.0 | 1.0 | 0.0122 | >181 | 13.6 |  |  |  |
|  | 2 | i-PrOH | 15 | 1.0 | 0.8430 | 0.7107 | 1.0 | 181 | 128.9 |  | 1.5 M | 33 |
|  | 3 | "Freon" 113 | 180 |  |  |  |  |  |  |  |  |  |
| J | 1 | 50/50 $HOCH_2CH_2OH$/$H_2O$ | 30 | 0.2248 | 1.0 | 1.0 | 0.050 | >181 | 56.3 |  |  |  |
|  | 2 | i-PrOH | 90 | 1.0 | 0.7833 | 0.6136 | 1.0 | 181 | 111.3 |  | 0.67 M | 10 |
|  | 3 | "Freon" 113 | 180 |  |  |  |  |  |  |  |  |  |
| K | 1 | 30/70 $HOCH_2CH_2OH$/$H_2O$ | 15 | 0.1105 | 1.0 | 1.0 | 0.0122 | >181 | 13.6 |  |  |  |
|  | 2 | $HOCH_2CH_2OH$ | 15 | 1.0 | 0.8430 | 0.7107 | 1.0 | >181 | 792 | 20 | — | — |
|  | 3 | "Freon" 113 | 180 |  |  |  |  |  |  |  |  |  |
| 41 | 1 | 50/50 $HCOOCH_3$/$H_2O$ | 15 | 0.231 | 1.0 | 1.0 | 0.053 | 21.9 | 1.2 | 8.4 | 36.3 M | 26 |
|  | 2 | $HCOOCH_3$ | 90 | 1.0 | 0.349 | 0.122 | 1.0 | 21.0 | 2.7 |  |  |  |
|  | 3 | "Freon" 113 | 90 |  |  |  |  |  |  |  |  |  |
| 42 | 1 | 71/29 $CH_3CHO$/$H_2O$ | 20 | 0.5 | 1.0 | 1.0 | 0.25 | 56.2 | 14.1 |  |  |  |
|  | 2 | $CH_3CHO^a$ | 180 | 1.0 | 0.294 | 0.0864 | 1.0 | 56.2 | 4.9 | 8.5 | 60.5 M | 29 |
|  | 3 | "Freon" 113 | 45 |  |  |  |  |  |  |  |  |  |
| 43 | 1 | .07/99.93 i-octylalcohol/$H_2O$ | 2880 | $9.7 \times 10^{-5}$ | 1.0 | 1.0 | $9.3 \times 10^{-9}$ | >181 | $1.5 \times 10^{-5}$ |  |  |  |
|  | 2 | i-PrOH$^a$ | 120 | 1.0 | 0.118 | 0.014 | 1.0 | 181 | 2.5 |  | 15.8 M | 21 |
|  | 3 | "Freon" 113 | 1080 |  |  |  |  |  |  |  |  |  |

$^a$plus molecular sieve 3A.

I claim:

1. In the process for drying a semipermeable, polymeric membrane that is wet with an aqueous membrane-wetting liquid by contacting the wet membrane with at least one replacement liquid inert to the membrane and to the membrane-wetting liquid to remove water from the membrane and removing the replacement liquid from the membrane; the improvement which comprises contacting, at a temperature of about from −50° C. to 50° C., said wet semipermeable polymeric membrane in which the polymer has a Critical Surface Tension of at least about 42 dynes per centimeter with at least one replacement liquid consisting essentially of at least one organic solvent which is selected from the class consisting of an aliphatic alcohol having 1-3 carbon atoms, acetonitrile, and an aqueous solution thereof, and in which the organic solvent is capable of penetrating the membrane and has a surface tension of less than about 35 dynes per centimeter at 20° C., and a hydrogen bonding parameter of at least about 1.5 (calories per cubic centimeter)$^{\frac{1}{2}}$, and wherein the relative surface tension of the membrane wetting liquid, the concentration of the solvent in the replacement liquid and the viscosity and the molar volume of the organic solvent are such as to provide a Permeation Factor less than or equal to about 50, provided, however, that when the temperature of contact is about from 20° C. to −50° C., the Permeation Factor is less than or equal to about 100 − 2.5 T, wherein T is the temperature of contact in degrees centigrade; and after water has been substantially completely removed from the membrane, evaporating the replacement liquid to obtain a membrane free of water and replacement liquid.

2. A process of claim 1 wherein the Permeation Factor is less than about 30 for each step in which the water-wet membrane is contacted with replacement liquid.

3. A process of claim 1 wherein the first replacement liquid with which the water-wet membrane is contacted consists essentially of substantially anhydrous organic solvent.

4. A process of claim 1 wherein the first replacement liquid with which the water-wet membrane is contacted consists essentially of an aqueous solution of organic solvent.

5. A process of claim 4 wherein the organic solvent is selected from methanol, ethanol and isopropanol.

6. A process of claim 4 wherein the concentration of the organic solvent in the replacement liquid is continuously increased to substantially 100%.

* * * * *